United States Patent
Takasaki et al.

(10) Patent No.: US 8,064,874 B2
(45) Date of Patent: Nov. 22, 2011

(54) CONTROL STATION, CONTROLLING METHOD THEREOF AND STORAGE MEDIA

(75) Inventors: Atsushi Takasaki, Tokyo (JP); Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 540 days.

(21) Appl. No.: 12/273,294

(22) Filed: Nov. 18, 2008

(65) Prior Publication Data

US 2009/0129365 A1   May 21, 2009

(30) Foreign Application Priority Data

Nov. 21, 2007 (JP) .................................. 2007-302077

(51) Int. Cl.
*G06F 15/16* (2006.01)

(52) U.S. Cl. ......................... 455/345; 370/345; 709/217

(58) Field of Classification Search .................. 455/345; 709/217; 370/343, 345
See application file for complete search history.

(56) References Cited

U.S. PATENT DOCUMENTS

2008/0313304 A1 * 12/2008 Kanda ........................... 709/217

OTHER PUBLICATIONS

Htttp://www.usb.org/developers/wusb, Nov. 18, 2008.

* cited by examiner

*Primary Examiner* — Stephen Jones (74) *Attorney, Agent, or Firm* — Cowan, Liebowitz & Latman, P.C.

(57) ABSTRACT

This invention has as its object to reduce power consumption of dependent stations with low frequency of communication by controlling communications of the control station in a network. According to this invention, a control station communicating with dependent stations comprises a classification unit configured to classify the dependent stations connected to the control station into a plurality of groups; a first transmission unit configured to transmit first broadcast-frame to the dependent stations classified into first group; and a second transmission unit configured to transmit second broadcast-frame to the dependent stations classified into second group with lower frequency of communication compared to the first group, wherein the second transmission unit transmits the second broadcast-frame with a lower transmitting frequency compared to the first broadcast-frame transmitting frequency of the first transmission unit.

11 Claims, 11 Drawing Sheets

CONTROL STATION, CONTROLLING METHOD THEREOF AND STORAGE MEDIA

BACKGROUND OF THE INVENTION

1. Field of the Invention

The present invention relates to a communication control technique in control stations.

2. Description of the Related Art

Wireless Universal Serial Bus (hereafter: WUSB) has been standardized as one of the communication methods in Wireless Personal Area Networks (WPAN).

WUSB is an extension of widely used USB standard to wireless domain, which has installed a plurality of products as wired communication standard. Aforementioned standard is publicly available as in URL="http://www.usb.org/developers/wusb/".

One of the characteristics of WUSB standard is partial simplification of wireless modulation method while compliant with WiMedia (one of the Ultra Wide Band communication method standard). Hereinafter, the wireless communication of aforementioned standard is explained using examples.

In wireless communication according to WUSB standard, each terminal is controlled to communicate with other terminals within the assigned time slot, based on time-division multiplexed system of fundamental WiMedia standard.

The communication slot assignment to each terminal is conducted by the terminal which acts as a control station (Host) by negotiate with the terminals which act as WiMedia-terminal according to the Wimedia standard. Moreover, at Host the allocated communication slot is segmented and by applied time-division multiplexing unique to WUSB standard, WUSB control data is transmitted to the Device. As mentioned above, Host of WUSB standard employs a hierarchized access control system.

In contrast, access control method of Device in WUSB standard is not always in compliant with WiMedia standard.

Stated differently, in case of Device in WUSB standard, while using WiMedia standard for wireless modulation methods, only a simplified WUSB standard is used as the access control method. By using such an approach, terminal architecture become simplified and power consumption of the terminal is reduced.

Access control method of Device compliant with simplified WUSB standard is explained below.

Figure 10A:
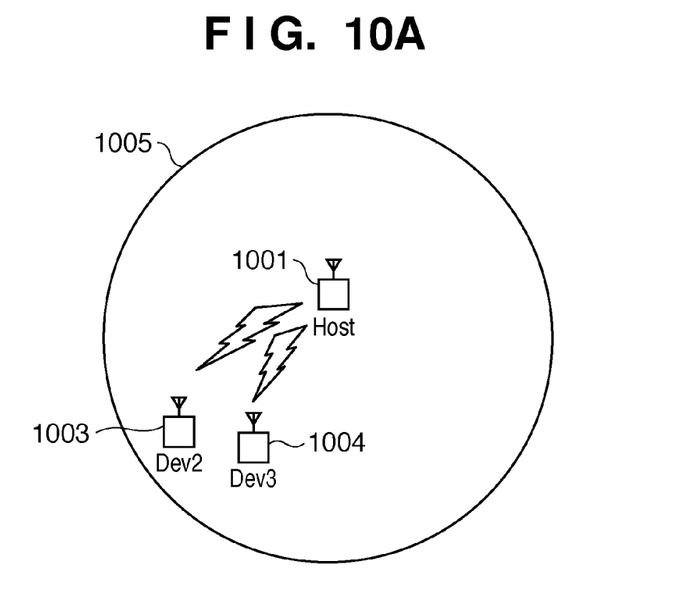
FIG. 10A is a view showing an example of wireless network (1005) constructed by establishing connection by a device compliant with WUSB to a Host compliant with WUSB.

FIG. 10A is a representation of a wireless communication network (1005) constructed by wirelessly connecting Devices compliant with WUSB standard to Host compliant with WUSB standard. 1001 is a Host compliant with WUSB standard; 1003 and 1004 is Devices compliant with WUSB standard.

Figure 10B:
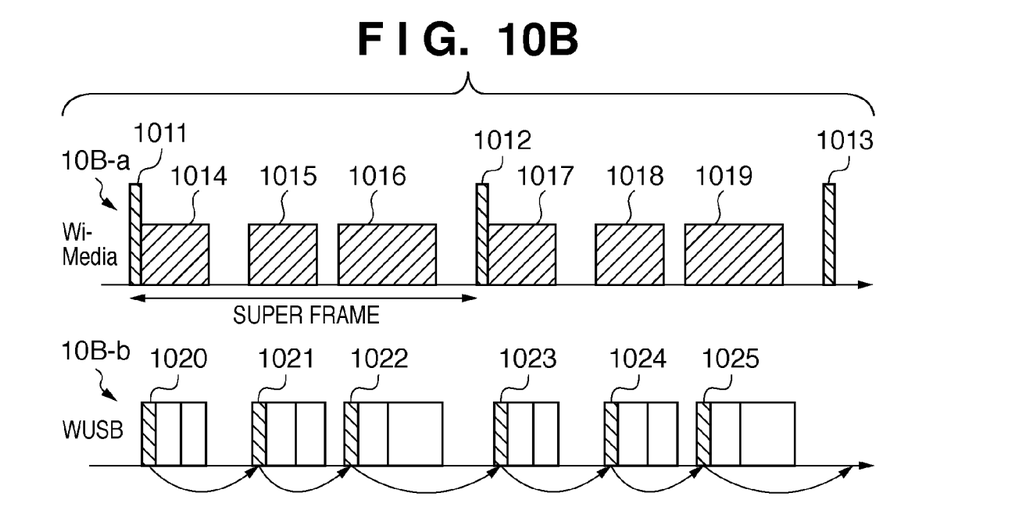
FIG. 10B is a view showing the communication slot allocation based on WiMedia standard, and the communication slot segmentation based on time division multiplexing according to WUSB standard in the wireless network represented in FIG. 10A.

Moreover, FIG. 10B is a representation of, the time slot allocation based on Wimedia standard, and segmentation of the time slots based on time-division multiplexing unique to WUSB standard, with reference to FIG. 10A.

In WiMedia standard as discussed previously, Host (1001) starts time slot allocation as a terminal compliant with WiMedia standard (Hereinafter: WiMedia-terminal). In case of WiMedia time-division multiplexing, there is a time period where each WiMedia-terminal transmits each other control data (beacon) and a communication time slot (MAS) after aforementioned time period where each WiMedia-terminal communicates with others. By repeating these time periods as a supper-frame (broadcast-frame) at a constant frequency, time-shared controlling of multiplex communication between multiple WiMedia-terminal is implemented.

One cycle of Supper-frame contains 256 MAS, and each WiMedia-terminal secures its communication time slot sequentially based on this MAS unit. In WiMedia-terminals already connected to the network, the beacon transmitted by each terminal contains the occupied MAS information.

On the other hand, new WiMedia-terminal connecting the network analyzes the existing WiMedia-terminal beacons and selects a communication frame for itself without overlapping. In addition, negotiation protocol of the communication frame between WiMedia-terminals, is not directly related to present invention, and is not discussed.

In FIG. 10B-*a*, the state where Host (1001) has already ended the negotiation, and connected to the network as a WiMedia-terminal with an allocated time slot is represented. Beacon 1011~1013 is sent at a constant frequency; and interval between two beacon starting points become 1 cycle of the Supper-Frame.

As shown in FIG. 10B-*a*, in one cycle of the Supper-Frame, the communication slot is separated into 3 MAS group 1014~1016 and allocated to each WiMedia-terminals. Similarly, in next Supper-Frame, the communication slot is classified into 3 MAS group 1014~1016 and allocated. However, because MAS positions are not constant, the MAS positions are updated due to WiMedia-terminal negotiations.

Here Host (1001) further segmentation of allocated MAS to create communication slots only compliant with WUSB.

More specifically, Host (1001) transmits irregular WUSB control information called Micro-scheduled Management Commands (MMC) to allocated MAS. Each MMC contains as indication information such as, Device identification information of communicable Devices compliant with WUSB standard in the slot following the MMC, information on communication slots position, and the next timing of MMC.

Instead, in each Device (Dev1(1003), Dev2(1004)) can obtain its allocated time slot by just analyzing MMC without considering beacon 1011~1013 compliant with WiMedia standard. For this reason, in case each Device verifies the existence of its allocated time slot by MMC analyze, it conducts wireless communication with Host (1001) using this time slot.

As a result the Device receives the next MMC regardless of its' allocation or non-allocation of the time slot. It is necessary to obtain the next MMC transmitting timing to receive the next MMC.

As described above, in such access control method, the next MMC transmitting timing is obtained at the time MMC is received by the device compliant with simplified WUSB standard. Thus, even in case Hosts' (1001) MAS position information changed which obtained as a WiMedia-terminal, it can function as a device compliant with WUSB standard without any problems.

FIG. 10B-*b* represents the communication slot generation based on WUSB standard, in case Host (1001), Dev2 (1003) and Dev3 (1004) are connected into the wireless network 1005. As shown in FIG. 10B-*b*, inside MAS, MMC (1020~1025), and communication slot of each device follow after aforementioned MMC is positioned sequentially.

In FIG. 10B-*b* to simplify the explanation consecutive MAC has only 1 MMC in each of them. However, in a Host compliant with WUSB standard, segmentation of MAS is possible due to various reasons such as, requests by connected various Devices compliant with WUSB standard, applications and etc. Then, for each time MMC is positioned. For that reason, in fact there might be plurality of MMC within each MAS.

However, in case wireless communication is conducted based on WUSB standard, a problem of unnecessary power consumption emerges when Device with low data rate requirements in relatively long periods is participated to the network. Concrete description is given using the FIG. 11A and FIG. 11B.

Figure 11A:
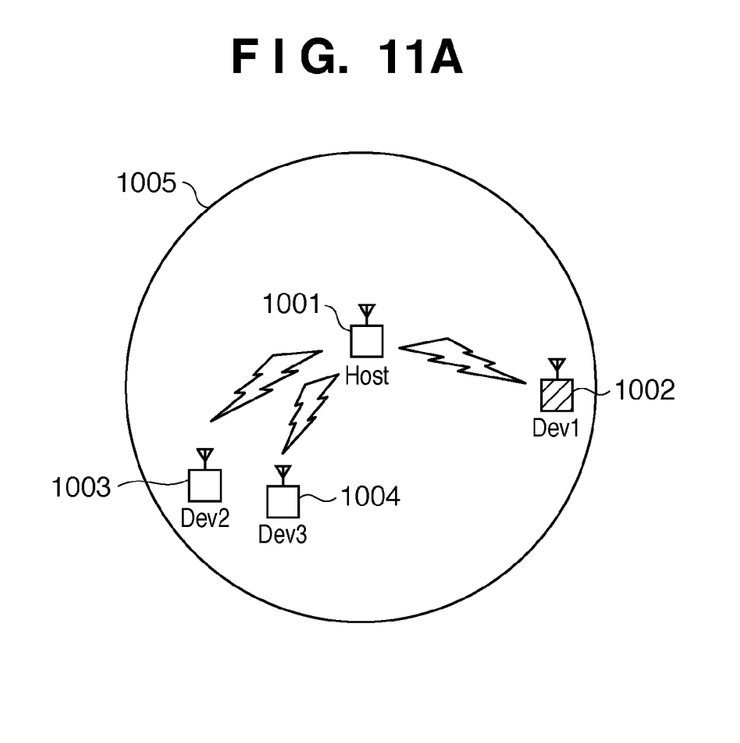
FIG. 11A is a view showing the state of the wireless network represented in FIG. 10A after Dev1 (1002) participated in the network.

FIG. 11A shows a new condition of the network when Dev1 (1002) is participated to the network shown in FIG. 10A.

Figure 11B:
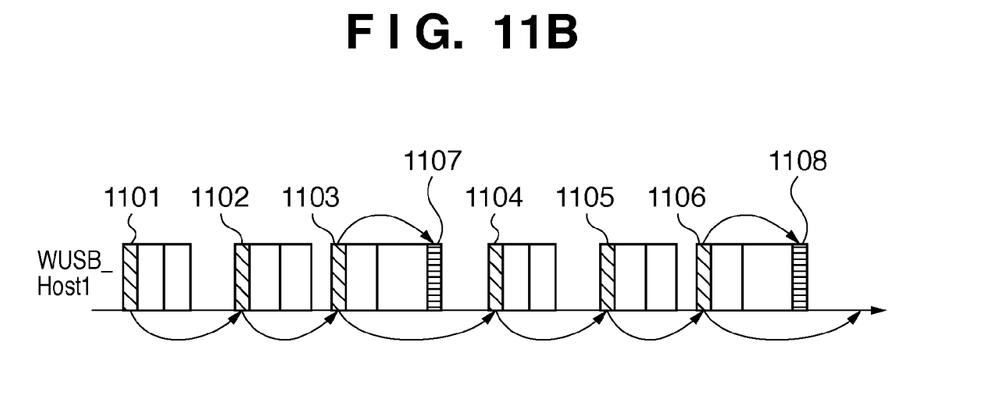
FIG. 11B is a view showing the wireless communication slot construction in the wireless network represented in FIG. 11A.

Dev1 (1002) depicted in FIG. 11A, is a device such as keyboard or mouse, which requires low data rate in relatively long periods. And, FIG. 11B depicts an example of communication slot construction.

As described above, in wireless communication according to WUSB standard, the communication slot that continues after MMC (1101~1108) does not necessarily allocate communication slots for every device in the network. In case of communication slot (1107, 1108) of Dev1 (1002) is concerned, it is sufficient to allocate a narrow time slot with frequency of just once within the WiMedia-terminals' supper frame.

However, in each MMC contains the next MMC transmitting timing information. For this reason, Dev1 (1002) needed to receive and analyze MMC in order to preserve the wireless connection even in case it has no allocated communication slots.

Here, MMC is added depending on communication frame allocated as a WiMedia-terminal and number of devices connected to the same host. For this reason, for Devices such as Dev1 (1002) with relatively low frequency of communication, with MMC additions the time spend on MMC analyze unrelated to its communication become high, repetition of unnecessary data receiving operation is generated. Such receiving operation, increases the power consumption, especially in case of for Devices which use batteries, problem of battery life reduction is generated.

SUMMARY OF THE INVENTION

The present invention has been made in consideration of the above problems. The control station according to the present invention is constructed as follows. That is, a control station communicating with dependent stations, comprises: a classification unit configured to classify the dependent stations connected to the control station into a plurality of groups; a first transmission unit configured to transmit first broadcast-frame to the dependent stations classified into first group; and a second transmission unit configured to transmit second broadcast-frame to the dependent stations classified into second group with lower frequency of communication compared to the first group, wherein the second transmission unit transmits the second broadcast-frame with a lower transmitting frequency compared to the first broadcast-frame transmitting frequency of the first transmission unit.

According to the present invention, by controlling communication of the control station in a network, power consumption of lower frequency of communication dependent stations has been reduced.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

First Embodiment

1. Construction of the Control Station

Figure 1:
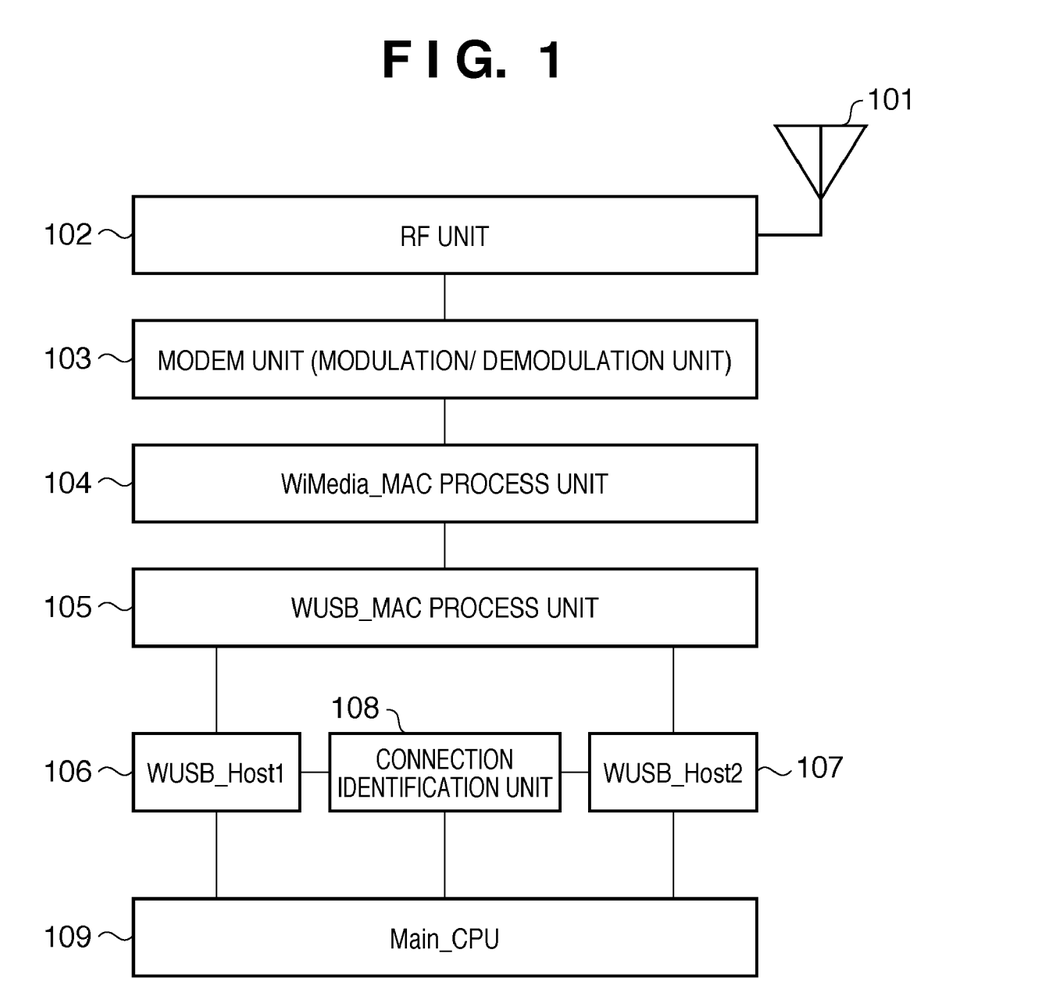
FIG. 1 is a block diagram showing the internal construction of wireless unit of the control station (Host compliant with WUSB) according to the first embodiment of the present invention.

FIG. 1 is a block diagram, which represents the internal construction of wireless unit of the control station (Host compliant with WUSB standard) according to the first embodiment of the present invention. The FIG. 1 only represents the units related to the present invention, among the wireless units of Hosts compliant with WUSB standard; the functional units of Host that are not directly related to the invention are omitted from the figure.

101 is an antenna; carrier detection and channel identification is conducted at RF unit 102 on the signal received through the antenna 101; thereafter, at modulation and demodulation unit 203 demodulated and converted into base band signal. In actual terminal, more complex procedures is conducted even up to this step, however due to the fact theses steps are not directly related to present invention, it has been omitted from the explanation.

Base band signal demodulated and converted into a bit stream is passed into WiMedia_MAC process unit 104, and WUSB_MAC process unit 105. Each MAC process unit (104, 105) conducts identification process on received bit stream based on signal (Beacon or MMC) of each access control method.

Here, only the wireless communication according to WUSB standard is explained; even though in this case explanation of the functionality of WiMedia_MAC process unit 104 is not necessary; due to the fact it is a necessary unit for Host implementation, it is represented. Even though when implemented the two MAC functions has some internal units that can be shared; two MAC functions are represented in different blocks to indicate the different functionality.

WUSB_Host1 (106) and WUSB_Host2 (107) are both processing units used for implementing Host functionality according to WUSB standard, which bears separate HostID and function as logically separated Host. The MMC contained in the first broadcasting frame or the second broadcasting frame transmitted by WUSB_Host1 (106) and WUSB_Host2 (107) contains the each different HostID. And, when WUSB_Host2 (107) is considered as a WUSB_Host for low power consumption mode, MMC transmitting period is longer than that of WUSB_Host1 (106). More specifically, WUSB_Host1 (106) and WUSB_Host2 (107) become first communication protocol and second communication protocol which transmits each different MMC.

According to FIG. 1, the wireless unit such as Wimedia_MAC process unit 104 or WUSB_MAC process unit 105 is shared by each WUSB_Host (106, 107), however, each WUSB_Host (106, 107) does not function simultaneously. Therefore, it is possible to have such construction. Needless to say, the wireless unit such as MAC process unit (105, 104) can be also individually constructed.

Here, when a wireless communication network is constructed the Host and the Device conducts the connection processing as follows. First, Host sends out the control signal MMC. Meanwhile, Device receives the MMC, and determine whether it's the Host Device prefer to connect. When the Device determined it is the Host it prefers to connect, Device sends out a connection request to the Host. When Host receives the connection request from the Device it conduct the connection processing according to predefined process.

In case of WUSB standard, connection processing is conducted only between Host and Device, which has conducted authentication process (pairing) in advance. In pairing processing Device determines whether or not the Host is already authenticated Host based on HostID.

Regarding FIG. 1, WUSB_Host1 (106) is considered as an ordinary Host compliant with WUSB standard, functioning in normal mode WUSB_Host; and ordinary Device is considered to be paring with the WUSB_Host1 (106).

On the other hand, WUSB_Host2 (107) is considered as a low power consumption mode WUSB_Host and Devices which support low power consumption mode pair with WUSB_Host2 (107). In addition, conditions such as, which device is pairing with which Host (possible to connect to both Hosts), which WUSB_Host has the connection priority in connection processing time, are decided by the Device implementation, not decided by the Host standard.

Connection Identification unit (108) obtains information, information on Device type and function, and information related to communication condition such as information of device class of the standard. Then, based on obtained information, whether Device which sent out connection request to WUSB_Host is a Device with high frequency of communication or low frequency of communication (low power consumption supported or not) is decided and classified into groups. In present embodiment, Group1 contains Devices not supported low power consumption and Group2 contains Devices supported low power consumption. Here, low power consumption Devices have less frequency of communication compared to normal mode Devices without low power consumption support; thus the group classification can be considered to be based on frequency of communication.

In addition, device class information may be obtained at paring time or may be obtained at connection processing time from the actually connected Device. When device class information obtained once it is considered to saved with the unique identity of Device.

Main_CPU (109), after receiving the decision from Connection Identification Unit (108), determines whether Device requested the connection is connected correctly or not, and if needed, conducts the switching to each WUSB_Host (106, 107). In addition, switching to WUSB_Host 106 and 107 is explained in detail using flow chart of FIG. 2.

2. WUSB_Host Switching of the Control Station

Figure 2:
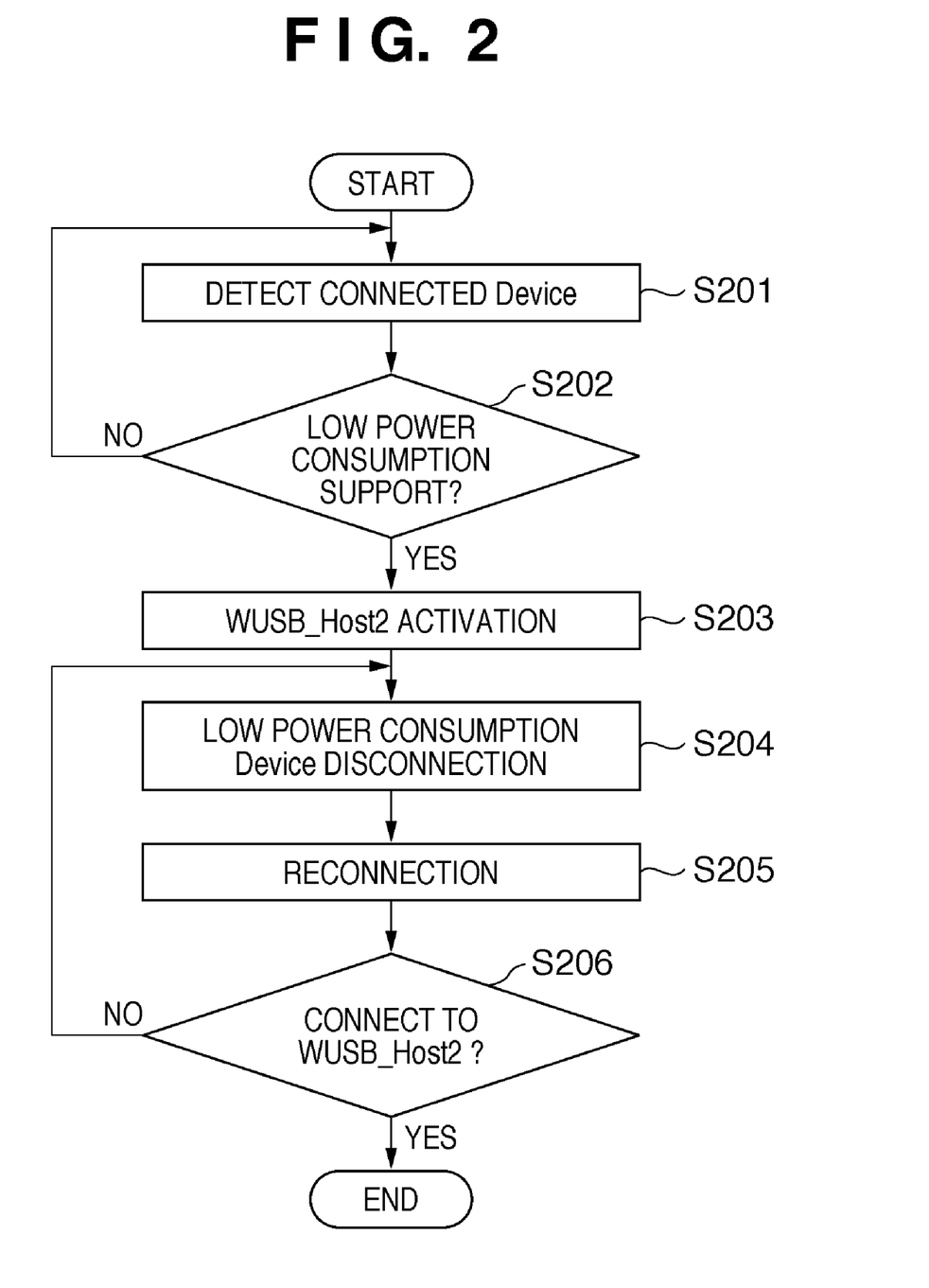
FIG. 2 is a flowchart showing the flow of WUSB_Host 106, 107 switching of the control station according to the first embodiment of the present invention.

FIG. 2 is a flowchart, which represents the flow of WUSB_Host 106, 107 switching of the Control station according to the present embodiment.

In step S201, the Control station monitors new Devices connected to Host. According to step S201 in case a new Device connected to Host is detected, proceed to step S202, and then the Control station determines whether the Device is a Device with low power consumption support or not. In other words, the Control station determines whether it is a Device, which supports low power consumption mode or not.

In step S202, in case it is a not a Device which supports low power consumption mode, the Control station returns to step S201 again and continues monitoring new Device connections.

On the other hand, in step S202, when Device is determined to be a low power consuming Device, proceed to step S203, and the Control station activates WUSB_Host2 (107) MMC transmitting.

Furthermore, in step S204, the low power consumption Devices connected to WUSB_Host1 (106) once get disconnected.

In this case, Device tries to reconnect, and reconnect process is conducted at the step S205. In this moment, Device receives MMC from the low power consumption WUSB_Host2 (107). For this reason, Device transmits a connection request to WUSB_Host2 (107).

Step S206 determines whether the connection request from Device is a connection request to connect WUSB_Host2 (107) or not, in case it is a connection request to WUSB_Host2 (107), the Control station conducts the connection processing.

As discussed above, due to Device connection processing dependent of implementation, it can be envisaged cases which attempt to reconnect to normal mode WUSB_Host1 (106). In such cases, by disconnecting the connection or rejecting the connection, step S204~S206 are looped until Device is connected to WUSB_Host2 (107). By rejecting WUSB_Host1 (106) connections at some point Device get connected to WUSB_Host2 (107). When WUSB_Host2 (107) is detected the connection request from the Device, connection processing is conducted.

Because of this reason, Device with low power consumption support does not require to receive MMC signal to conduct wireless communication and low power consumption is realized by reducing the unnecessary signal receiving processing.

3. Practical Example

A practical example of the wireless communication network including a Control station according to the present embodiment is explained as follows. A case that exemplifies the characteristics of the Control station according to the present embodiment as explained above, is discussed. Specifically, when a wireless communication network is constructed by plurality of Devices connecting to the Control station (hereinafter (1)), a case where a low power consumption Device connects to the wireless communication network afterwards (hereinafter (2)) is discussed.

Figure 3A:
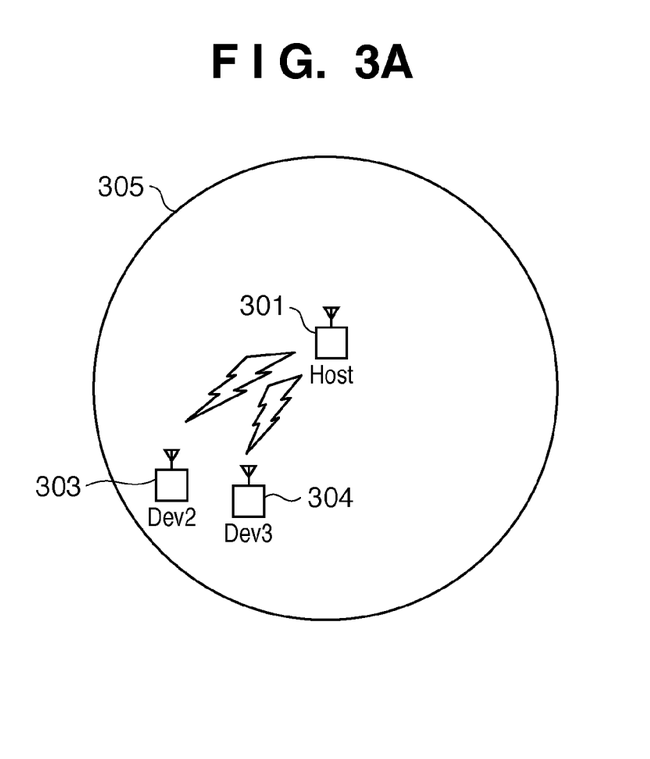
FIG. 3A is a view showing one example of the wireless network constructed including the control station according to the first embodiment of the present invention, before the low power device transmits a connection request to the network.

(1) The network construction and communication slot construction of the wireless communication network before the low power consumption Device is connected FIG. 3A is a view of an example of wireless communication network including the Control station according to the present embodiment, which represents the network state before a low power consumption device is connected to the wireless communication network.

In FIG. 3A, 301 is a Host compliant with WUSB standard which is the Control station according to the present embodiment (Hereinafter: Host 301); 303 and 304 are Device compliant with WUSB standard (Hereinafter: Dev2 (303), Dev3 (304)).

Figure 3B:
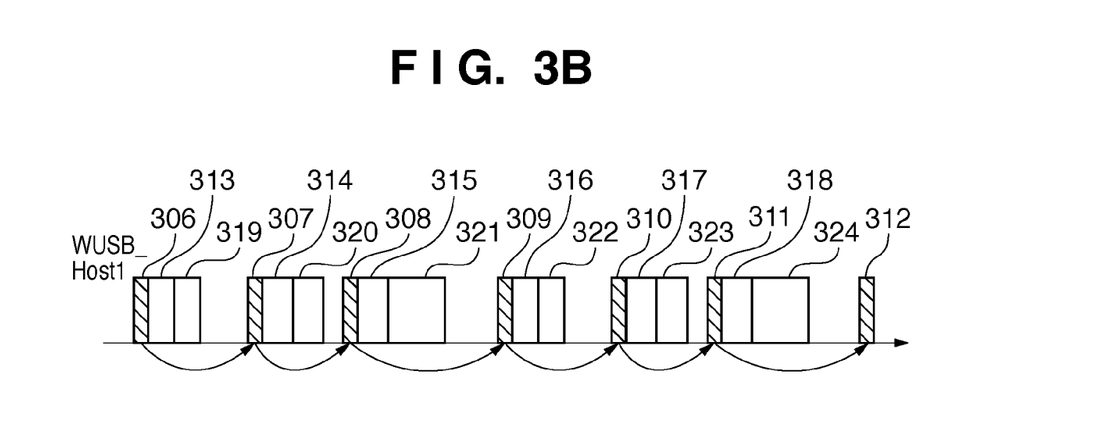
FIG. 3B is a view showing the wireless communication slot construction in the wireless network represented in FIG. 3A.

FIG. 3B is a figure showing communication slot construction of wireless communication network represented in FIG. 3A.

Host301 (specifically, WUSB_Host1 (106)) announce communication slot construction to Dev2 (303) and Dev3 (304) by sending out MMC denoted in 306~312.

Based on assignment information of MMC, Dev2 (303) conducts wireless communication with Host 301 using communication slots 313~318. And also, based on assignment information of MMC, Dev3 (304) conducts wireless communication with Host 301 using communication slots 319~324.

In fact, communication slots are separated in to more detailed slots such as allocation time differentiation, from Host 301 to Dev2 (303), from Host 301 to Dev3 (304), from Dev2 (303) to Host 301, and from Dev3 (304) to Host 301. However, for simplification of the discussion, only the aforementioned simple construction of each Device is considered.

Figure 4A:
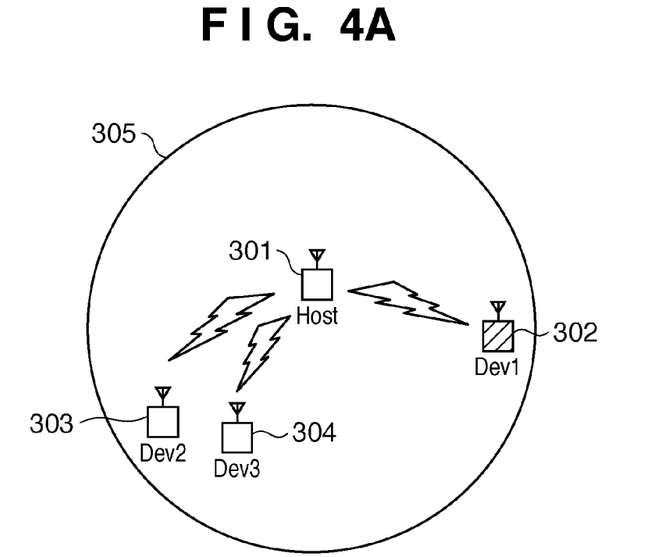
FIG. 4A is a view showing the state of the wireless network represented in FIG. 3A after a low power device participated in the network.

(2) The network construction and communication slot construction of the wireless communication network after the low power consumption Device is activated FIG. 4A is a view of an example of wireless communication network including the Control station according to the present embodiment, which represents the network state after a low power consumption device is connected to the wireless communication network represented in FIG. 3A.

In FIG. 4A, 302 is a newly participated low power consumption Device to the wireless communication network, as example, a Device such as keyboard or mouse.

Figure 4B:
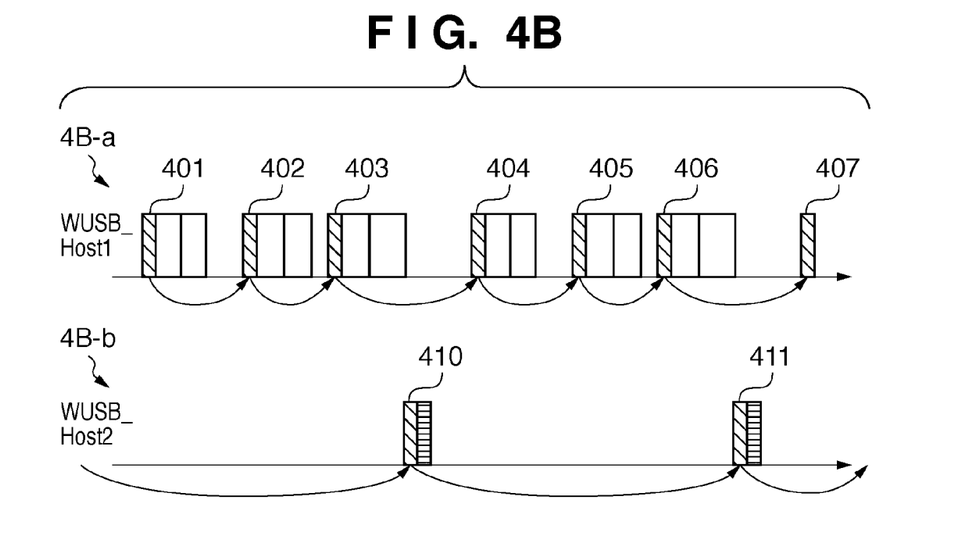
FIG. 4B is a view showing the wireless communication slot construction in the wireless network represented in FIG. 4A.

FIG. 4B is a figure showing communication slot construction of wireless communication network represented in FIG. 4A.

Even thought Dev1 (302) can identify its communication slots by analyzing MMC represented in FIG. 4B(a) 401~407, in actual cases, its communication slots are identified only in analyzing the MMC of 403 to 406. Thus, Dev1 (302) only uses MMC, except the MMC (403 to 406), just for extracting the next transmitting timing.

Here, when Host301 is detected Dev1 (302) participating to the network, low power consumption supported WUSB_Host (WUSB_Host2 (107)) is activated. Then, it is controlled such that, the wireless communication with Dev1 (302) is conducted by WUSB_Host2 (107).

FIG. 4B-b is a figure showing communication slot construction between WUSB_Host2 (107) and Dev1 (302).

Newly activated WUSB_Host2 (107) regulate the communication slots of Dev1 (302) using MMC 410,411. As explained above, WUSB_Host2 (107) separately control the MMC of Dev1 (302), and as a result unrelated MMC reception of Dev1 (302) vanishes. Additionally, because of the transmission interval of WUSB_Host2's (107) MMC 410, 411, is longer than the transmission interval of WUSB_Host1's (106) MMC (401~407), the frequency of a MMC received by Dev1 (302) get reduced.

Wireless communications between Dev2 (303) and Dev3 (304) are conducted by WUSB_Host1 (106) in a similar manner as conducted before. Specifically, communication slot allocation for Dev2 (303) and Dev3 (304) is conducted by transmitting MMC 401~407.

Due to Host301's activation of WUSB_Host2 (107) according to the necessity, it is possible to allocate sleep mode to Dev1 (302) in most cases unless it is transmitting information. As a result, compared to conventional state (FIG. 11B), substantial power consumption reduction is possible.

As apparent from above discussion, Control station according to the present embodiment, when a device with low frequency of communication is participated into the wireless communication network, is constructed to activate a new WUSB_Host for wireless communication, separated from usual dependent station with high frequency of communications.

As a result, dependent stations with low frequency of communication do not need to receive unnecessary MMC, and the dependent stations managed substantial power consumption reduction.

Second Embodiment

In above first embodiment, logically different two Hosts (WUSB_Host1, 2) were activated; present invention is not limited to the number of Hosts; logically different N Hosts (WUSB_Host1, 2, . . . ,N) may be activated.

Additionally, in above case, suitable WUSB_Host activation may be decided, without limiting to information extracted from Device, as an example, based information provided by drivers or higher layer applications. More detailed explanation of present embodiment is given below.

1. Construction of the Control Station

Figure 5:
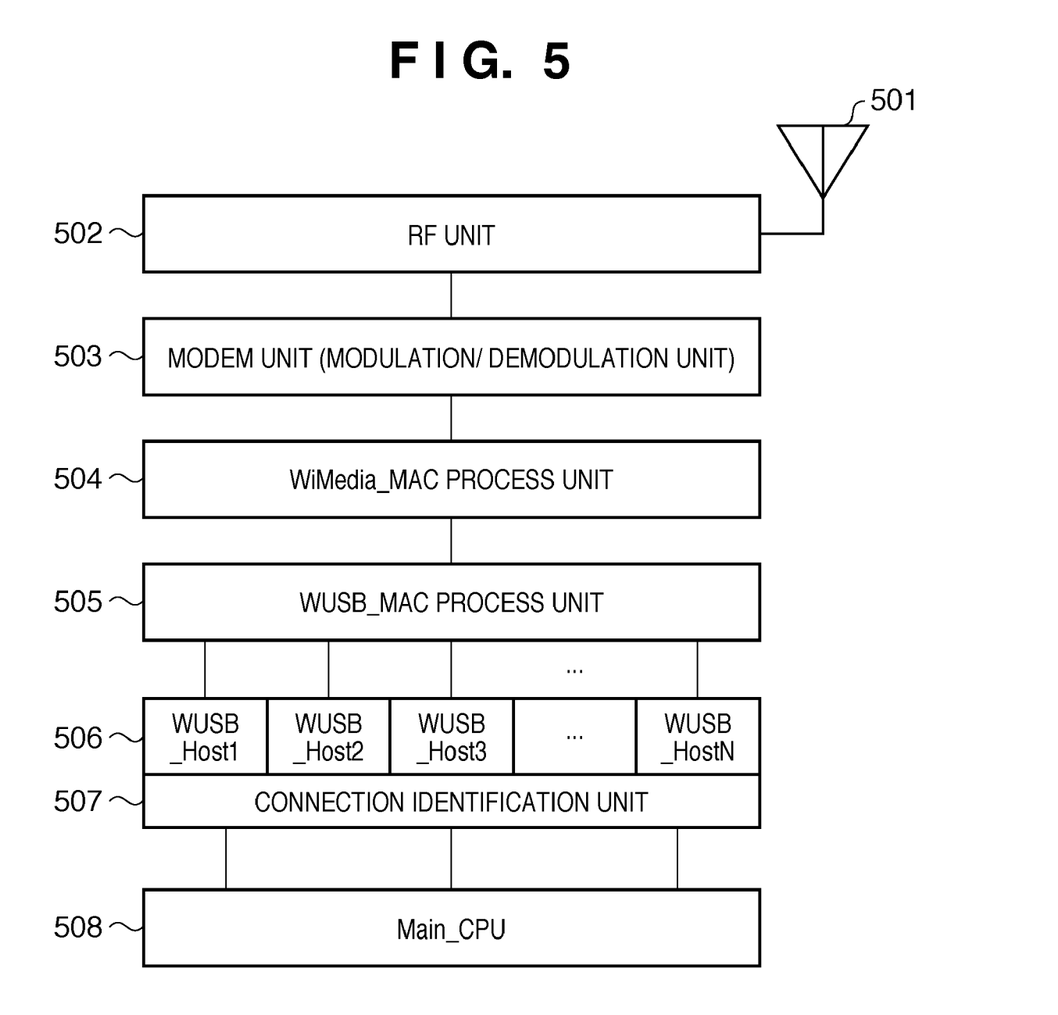
FIG. 5 is a block diagram showing the internal construction of wireless unit of the control station (Host compliant with WUSB standard) according to the second embodiment of the present invention.

FIG. 5 is a block diagram showing the internal construction of wireless unit of Control station according to the present embodiment. Similar to FIG. 1, FIG. 5 only shows the functions of wireless unit, which are directly related to the discussion of present invention. The discussion of other functions of wireless unit is omitted from the discussion.

Also, explanation of the units represented from 501 to 505 is the same as in units from 101 to 105 represented in FIG. 1; and explanation here is omitted.

506 is a processing unit that realize Host functionality compliant with WUSB standard; it is constructed to function as a plurality of logical Hosts with different Host Ids. MMC of each broadcast frame transmitted by each WUSB_Host1, WUSB_Host2, ..., WUSB_HostN, contains each HostID. In other words, each of WUSB_Host1, WUSB_Host2, ..., WUSB HostN sends out separated MMC.

According to FIG. 5, the wireless unit such as Wimedia_MAC process unit 504 or WUSB_MAC process unit 505 is shared by each USB_Host (506), however, each WUSB_Host does not function simultaneously. Therefore, it is possible to have such construction. The number of WUSB_Hosts is not fixed and denoted as N.

As discussed above, to create the wireless network first the Host sends out MMC with control signal. On the other hand, Devices identify whether there is a MMC from the Host it wants to connect or not, in case it identified a MMC it sends out a connection request. When Host received this signal it conducts connection according to predefined procedures.

In case of WUSB standard, connection procedures are only conducted between the Hosts and Devices already paired (authentication processing is already conducted). In Pairing, Devices categorize authenticated and non-authenticated Hosts based on their HostsID. Here in FIG. 5, WUSB_Host1 is considered to be a ordinary Host compliant with WUSB standard functioning as a ordinary mode WUSB_Host, and Device is considered to be a ordinary Device paired with WUSB_Host1.

On the other hand, WUSB_Host2~WUSB_HostN are low power consumption mode WUSB_Hosts. Here, each low power consumption Device is considered to be paired with a different WUSB_Host in addition to WUSB_Host1. Additionally, the MMC transmitting period of WUSB_Host2~WUSB_HostN is considered to be longer than MMC transmitting period of WUSB_Host1 (106). Furthermore, based on at least one information concerning connected device, such as, type, function, communication condition, the transmission interval of MMC by WUSB_Host2~WUSB_HostN may be changed.

Connection identification unit 507, as examples, device class information according to WUSB standard such as Device type, Device function, communication condition, is extracted from the Devices, which are trying to connect the WUSB_Host. Then, based on the extracted information, it is determined whether the Device is a device with high frequency of communication or with low frequency of communication, in case of a device of low frequency of communication, the appropriate WUSB_Host for wireless communication is determined. Here, Device with low frequency of communication is classified into sub groups based on their frequency of communication and allocated to appropriate WUSB_Host for wireless communication based on these sub groups.

Device class information may be extracted at the pairing time or from the Device at connection establishment time. Once information is extracted, the information is saved with the Device identification.

In Main_CPU 508, based on determination result by connection identification unit 507, it is decided whether connection requested Device is connected to an appropriate WUSB_Host or not, and if necessary conduct WUSB_Host switching processing.

2. WUSB_Host Switching Procedures of the Control Station

The detailed discussion of WUSB_Host switching processing of each Device is omitted here, due to the process flow similarity as in flow chart of FIG. 2 in first embodiment.

In the first embodiment, there is only two types of WUSB_Host, in case of low power consumption device is requested a connection, WUSB_Host2 was activated. However, in the present embodiment there are a plurality of WUSB_Hosts, which WUSB_Host should be activated is should be determined based on device class information or instruction by drivers, etc.

Here, the WUSB_Host allocation processing is discussed as follows.

3. WUSB_Host Allocation Processing of the Control Station

Figure 6:
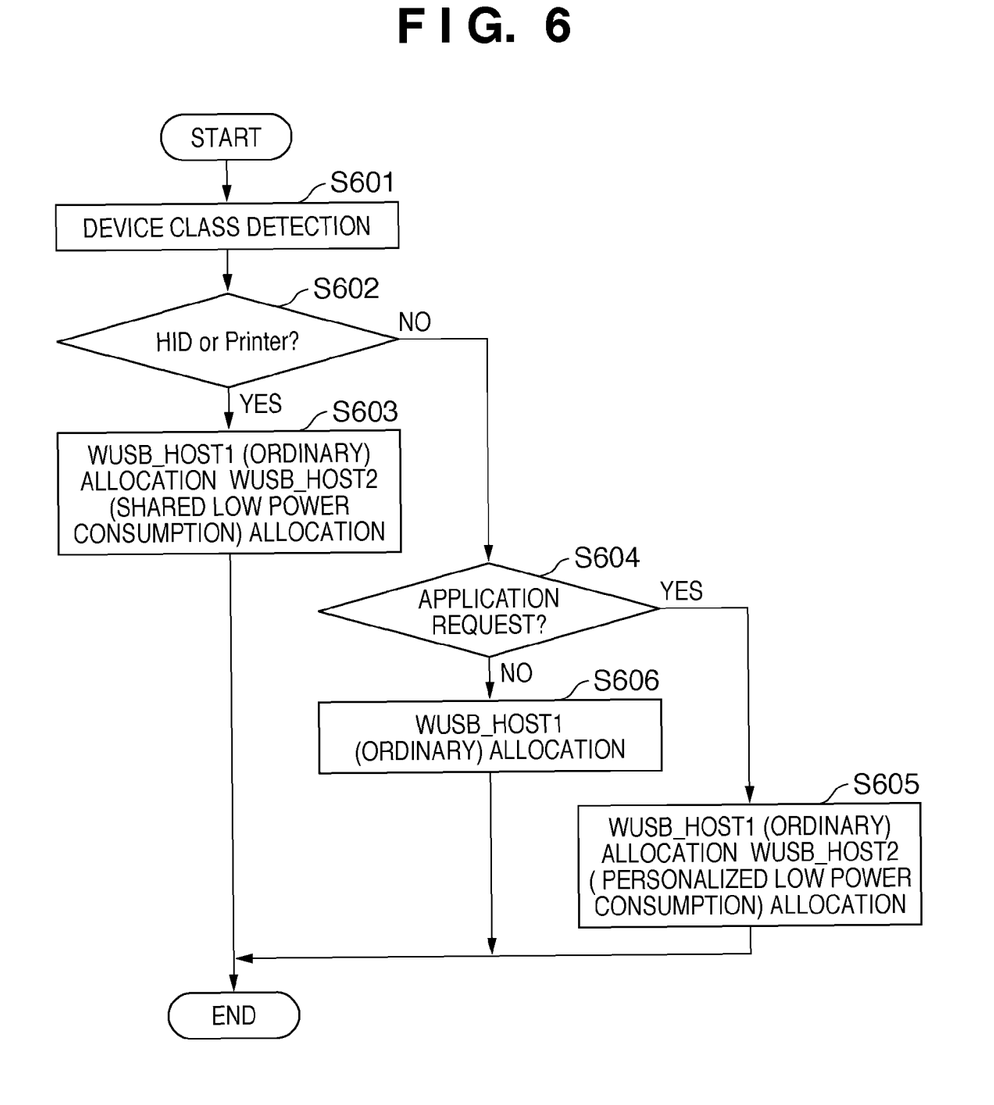
FIG. 6 is a flowchart for representing the flow of allocation process of the WUSB_Host of the control station according to the second embodiment of the present invention.

The allocation processing for allocating each Device to a different WUSB_Host is explained using FIG. 6. FIG. 6 is a flow chart that shows the flow of WUSB_Host allocation processing of the Control station.

Since WUSB_Host1 extracts the Device information at pairing time or at initial connection establishment time; at step S601, connection identification unit 507 determines the type of Device by using the device class information.

At step S602, a determination is made regarding whether concerned Device is a HID (Human Interface Device) or a Printer or not. In case Device is determined to be a HID (Human Interface Device) or a printer at step S602, proceeds to step S603.

In Step S603, in addition to ordinary mode WUSB_Host1, WUSB_Host2 which is a shared low power mode Host is also allocated to the Device. In addition, WUSB_Host2 is considered to be a Host compliant with WiMedia standard which conducts communication only once within a supper frame.

On the other hand, in case Device is decided to be not a HID or a printer, proceeds to step S604.

Step S604 decides whether or not a driver or an application that controls the Device requested a specific connection point, and in case there was such a request proceeds to step S605.

In step S605, in addition to ordinary mode WUSB_Host1, an individual low power mode WUSB_HostN (N is number except 1 or 2) is allocated with a unique number for that Device.

Individual low power mode WUSB_HostN can be scheduled to have the optimal low power mode for each device, as an example, communicating 2 times in each supper frame according to WiMedia standard can be set according to the need. Moreover, even though each Device is allocated to unique WUSB_Host, also as an option scheduling can be changed accordingly.

On the other hand, in step S604, in case there is no request for a specific communication point, proceeds to step S606 and Device is allocated only to ordinary mode WUSB_Host1.

4. Practical Example

A practical example of the wireless communication network including a Control station according to the present embodiment is explained as follows. A case that exemplifies the characteristics of the Control station according to the present embodiment as explained above, is discussed. Specifically, in case Control station is connected to a plurality of Devices while creating a wireless communication network (hereinafter: state (1)); a state where a shared low power Device and individual low power Device is participated to the network (hereinafter: state(2) and state(3)) is explained.

Figure 7A:
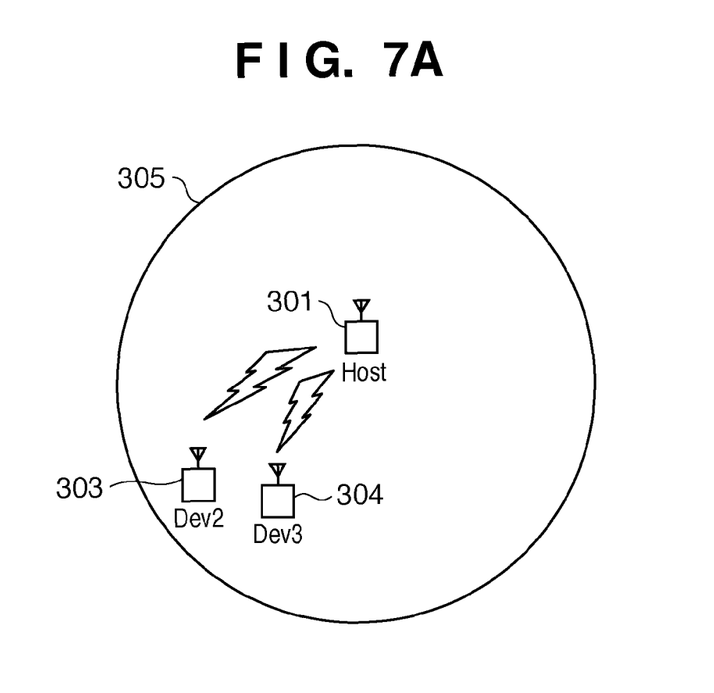
FIG. 7A is a view showing a network construction before the low power device is activated.
Figure 7B:
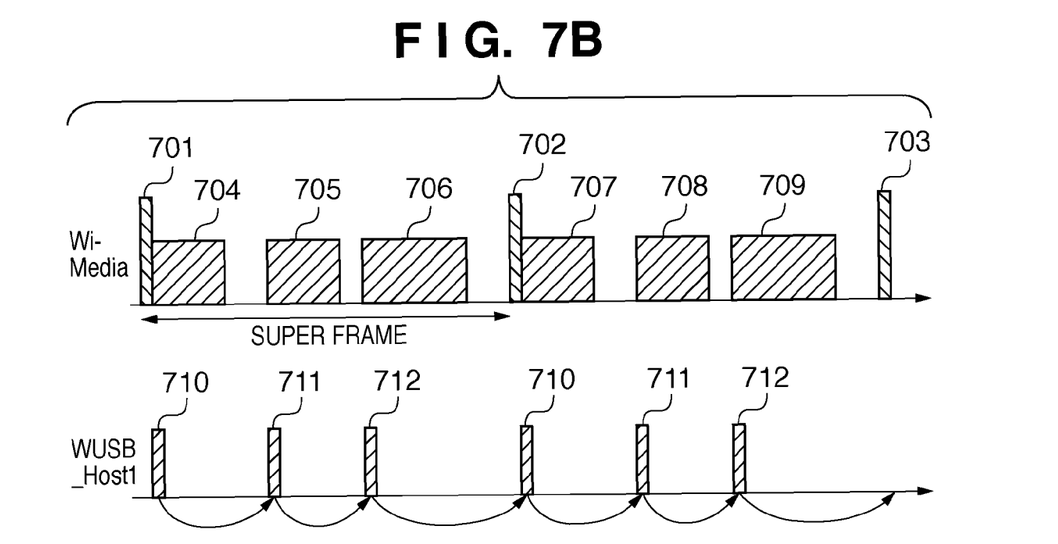
FIG. 7B is a view showing the wireless communication slot construction in the wireless network represented in FIG. 7A.

(1) The communication slot construction of the wireless communication network before shared low power device is activated FIG. 7A represents the wireless communication network before low power Devices were activated. And, FIG. 7B represents the communication slot construction in this stage of the network.

Host (301), similar to first embodiment, MAS position allocation is conducted according to WiMedia standard, and then based one allocated MAS, transmits MMC according to WUSB standard.

In FIG. 7B, 701~703 represent the beacons; and 704~709 represent the allocated MAS construction. Moreover, 710~715 represent MMC transmitted by WUSB_Host1.

Figure 8A:
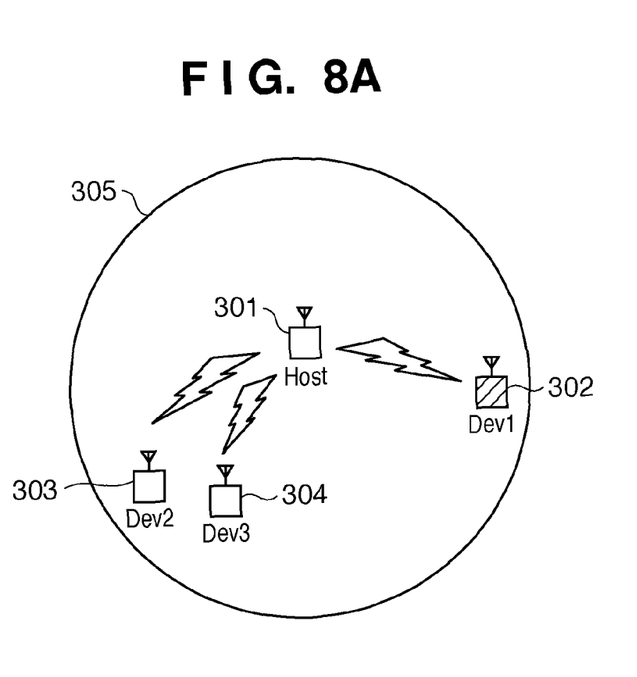
FIG. 8A is a view showing the state of the wireless network represented in FIG. 7A after a shared low power device participated in the network.

(2) The communication slot construction of the wireless network after a shared low power device is activated FIG. 8A shows the new network state changed from the state of FIG. 7A, after shared low power Device participated the wireless communication network.

Figure 8B:
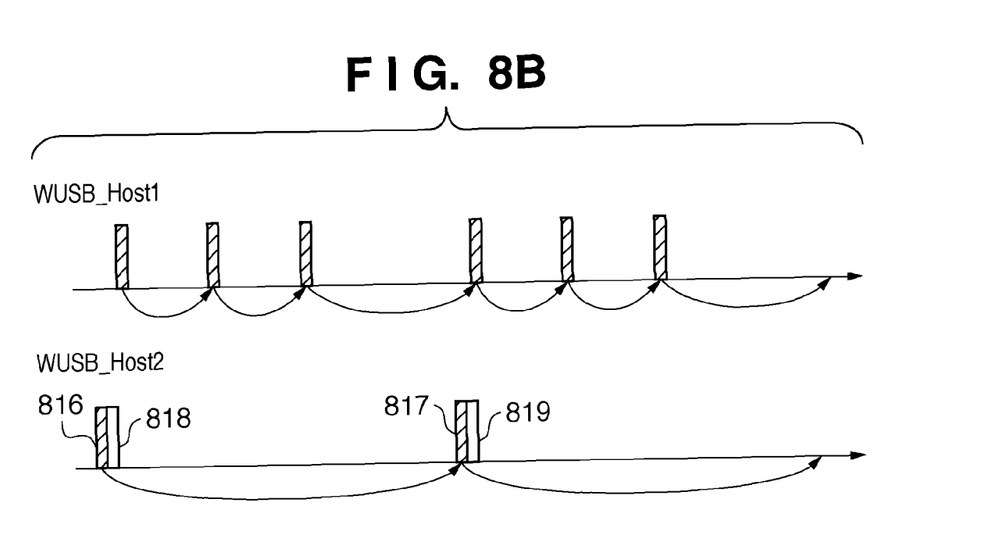
FIG. 8B is a view showing the wireless communication slot construction in the wireless network represented in FIG. 8A.

FIG. 8B is the communication slot construction of the wireless communication network shown in FIG. 8A. Host 301 detects the shared low power mode device (Dev1 (302)), then shared low power mode WUSB_Host2 get activated, and starts to transmit MMC as shown in FIG. 8B 816, 817.

Shared low power mode Device, according to the flow chart of the first embodiment as shown in FIG. 2, reconnects to WUSB_Host2, conducts wireless communication with Host 301 using slots 818, 819. For this reason, shared low power device can ignore receiving unnecessary MMC, resulting low power consumption.

Figure 9A:
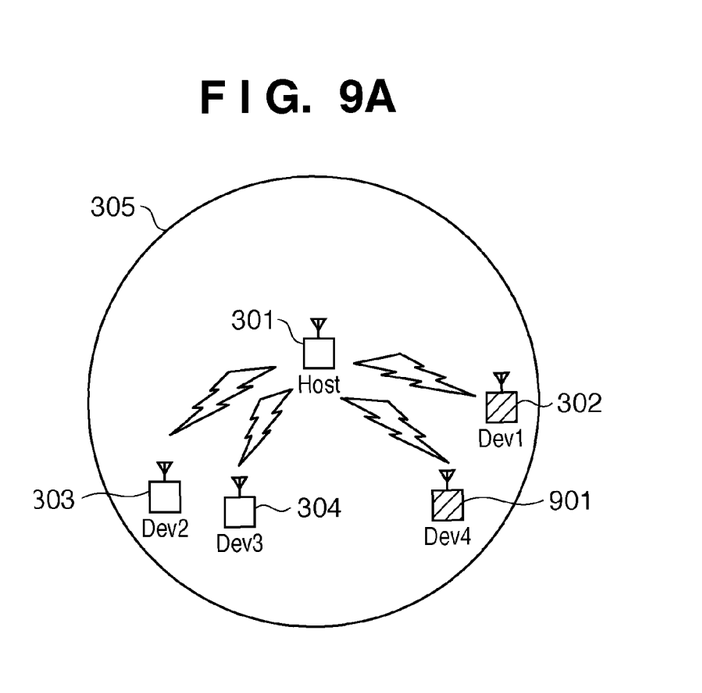
FIG. 9A is a view showing the state of the wireless network represented in FIG. 8A after a unique low power device participated in the network.

(3) The communication slot construction of the wireless network after an individual low power device is activated FIG. 9A shows the new network state changed from the state of FIG. 8A, after individual low power Device participated the wireless communication network.

Figure 9B:
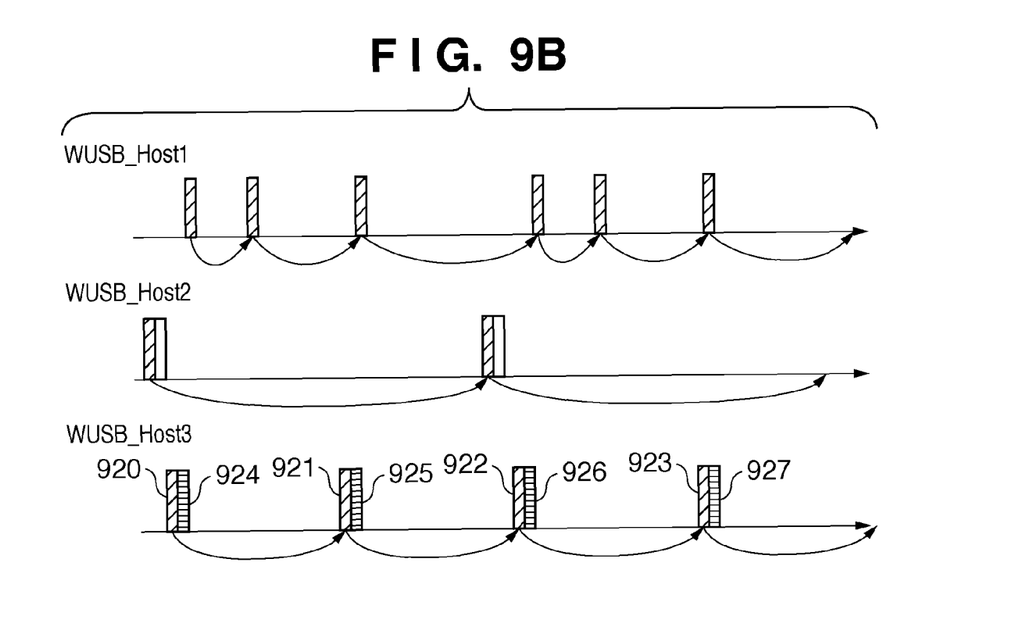
FIG. 9B is a view showing the wireless communication slot construction in the wireless network represented in FIG. 9A.

FIG. 9B represents the communication slot construction of the wireless communication network represented in FIG. 9A.

In Host 301, individual low power mode WUSB_Host3 is activated and started to transmit MMC as in FIG. 9B 920~923. Individual low power Device (Dev4 (901)) is activated similarly to the case shown in flow chart shown in FIG. 2 of first embodiment; first reconnects to WUSB_Host3, and then conducts wireless communication with Host 301 using allocated slots 924~927.

For this reason, individual low power Devices and shared low power Devices can reduce receiving unnecessary MMC signals, and able to conduct reducing power consumption optimized to each Device.

Other Embodiments

Note that the present invention may be applied to either a system constituted by a plurality of devices (e.g., a host computer, interface device, reader, printer, and the like), or an apparatus consisting of a single device (e.g., a copying machine, facsimile apparatus, or the like).

The objects of the present invention are also achieved by supplying a recording medium, which records a program code of software that implements the functions of the aforementioned embodiments to the system or apparatus. In this case, the functions are implemented when a computer (or a CPU or MPU) of the system or apparatus reads out and executes the program code stored in the recording medium. Note that the recording medium that stores the program code constitutes the present invention in such case.

As the recording medium for supplying the program code, for example, a floppy® disk, hard disk, optical disk, magneto-optical disk, CD-ROM, CD-R, magnetic tape, nonvolatile memory card, ROM, and the like may be used.

The present invention is not limited to the case in which the functions of the aforementioned embodiments are implemented when the computer executes the readout program code. For example, the present invention also includes a case wherein an OS (operating system) running on a computer may execute some or all of actual processes based on an instruction of the program code to implement the functions of the aforementioned embodiments.

Furthermore, the present invention also includes a case wherein the functions of the aforementioned embodiments are implemented after the program code read out from the recording medium is written in a memory equipped on a function expansion board or unit, which is inserted into or connected to the computer. That is, the present invention includes a case wherein after the program code is written in the memory, a CPU or the like equipped on the function expansion board or unit executes some or all of actual processes based on an instruction of the program code, so as to implement the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-302077, filed Nov. 21, 2007, which is hereby incorporated by reference herein in its entirety.

What is claimed is:

1. A control station communicating with dependent stations, comprising:
 a classification unit configured to classify the dependent stations connected to the control station into a plurality of groups;
 a first transmission unit configured to transmit first broadcast-frame to the dependent stations classified into first group; and
 a second transmission unit configured to transmit second broadcast-frame to the dependent stations classified into second group with lower frequency of communication compared to the first group,
 wherein said second transmission unit transmits the second broadcast-frame with a lower transmitting frequency compared to the first broadcast-frame transmitting frequency of said first transmission unit.

2. A control station according to claim 1, wherein each of said first transmission unit and said second transmission unit has a unique identifier and the identifier of each transmission unit are included in each of the first broadcast-frame and the second broadcast-frame transmitted by each transmission unit.

3. A control station according to claim 1, further comprising a control unit configured to, when the dependent station classified into second group is connected with said first transmission unit, control said first transmission unit so that said first transmission unit once disconnects the dependent station and then control said second transmission unit so that said second transmission unit connects with the dependent station.

4. A control station according to claim 1, wherein said classification unit classifies the dependent stations into the plurality of groups based on the information obtained from the dependent stations, and the information includes, classification information of the dependent station, or function information of dependent station, or communication condition.

5. A control station according to claim 1, wherein said classification unit classifies the dependent stations into the plurality of groups based on whether the dependent station supports low power consumption mode or not.

6. A control station according to claim 1, wherein the broadcast-frame transmission interval of said second transmission unit is selected longer than the broadcast-frame transmission interval of said first transmission unit and thereby said second transmission unit transmits the second broadcast-frame with a lower transmitting frequency compared to the first broadcast-frame transmitting frequency of said first transmission unit.

7. A control station, which communicates with a dependent station that identifies their communication slot allocations based on information included in broadcast-frame, comprising:
   a determination unit configured to determine whether or not low power consumption mode is set in the dependent stations which connects to the control station; and
   a transmission unit configured to transmit a second broadcast-frame, to the dependent stations which are determined to be set lower power consumption by said determination unit, with longer interval than the interval of first broadcast-frame transmitted to the dependent stations which are determined to be not set lower power consumption by said determination unit.

8. A controlling method in a control station communicating with dependent stations, the method comprising:
   a step of classifying the dependent stations connected to the control station into a plurality of groups;
   a step of transmitting first broadcast-frame to the dependent stations classified into first group;
   a step of transmitting second broadcast-frame to the dependent stations classified into second group with lower frequency of communication compared to the first group,
   wherein the second broadcast-frame with a lower transmitting frequency compared to the first broadcast-frame transmitting frequency is transmitted.

9. A computer-readable storage medium storing a program for making a computer execute a controlling method according to claim 8.

10. A controlling method of a control station, which communicates with a dependent stations that identify their communication slot allocations based on information included in broadcast-frame, comprising:
    a determination step of determining whether or not low power consumption mode is set in the depending stations which connects to the control station; and
    a transmission step of transmitting a second broadcast-frame, to the dependent stations which are determined to be set lower power consumption at said determination step, with longer interval than the interval of first broadcast-frame transmitted to dependent stations which are determined to be not set lower power consumption at said determination step.

11. A computer-readable storage medium storing a program for making computer execute a controlling method according to claim 10.

* * * * *